July 16, 1963
R. E. FISCHBACHER
3,097,526
FLOWMETERS
Filed July 27, 1959
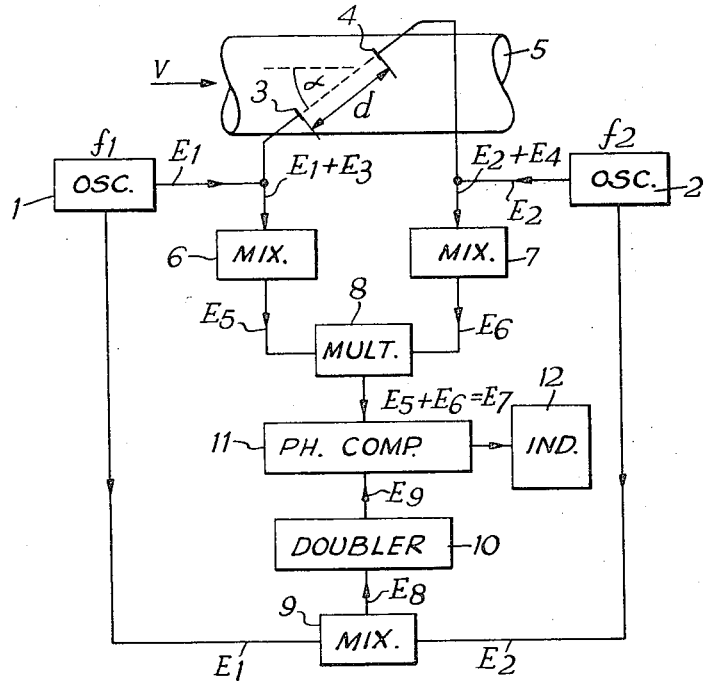
INVENTOR
RONALD ERNEST FISCHBACHER
BY
Lawson and Taylor
ATTORNEY 3,097,526
FLOWMETERS
Ronald Ernest Fischbacher, Orpington, Kent, England, assignor to National Research Development Corporation, London, England
Filed July 27, 1959, Ser. No. 829,916
Claims priority, application Great Britain Oct. 14, 1958
3 Claims. (Cl. 73—194)

This invention relates to flowmeters for measuring the rate of flow of a fluid medium, such as a liquid or slurry for example, relative to a body such as a pipe, by the transmission of ultrasonic waves through the medium.

A number of methods have been proposed for the use of ultrasonic waves to determine the flow rate of a fluid relative to a body, such as the rate of flow of a liquid through a pipe for example, and each of these methods depends on the apparent velocity of sound in the flowing fluid. These methods usually involve measurement of this apparent velocity in two directions, namely, with and against the direction of fluid flow. However, if two different paths are used for these two measurements different propagation conditions are usually encountered in the different paths resulting in errors of flow indication. This difficulty may be reduced by employing a single path and one pair of transducers for transmission and reception of the waves, respectively, and switching their roles so that the same path is used alternately in opposite directions. This solution is not suitable for circumstances necessitating a short propagation path, since there is then a requirement for very fast switching and this may only be achieved by complex electronic circuits.

A further partial solution to this difficulty is effectively to use the same path by placing the two pairs of transducers employed in close proximity. There is a difficulty here also in that too close a spacing of the pairs of transducers associated with different paths, one transducer for transmission and the other for reception, results in coupling between the two paths and consequent errors.

The object of the present invention is to reduce the above difficulties and to provide an improved flowmeter involving continuous ultrasonic wave propagation in two directions by the use of only one pair of transducers.

According to the present invention there is provided an ultrasonic flowmeter for measuring the rate of fluid flow relative to first and second transducers spaced apart along the flow path of said fluid both of said first and second transducers being simultaneously operative as transmitters and as receivers of said ultrasonic waves so as to provide simultaneous signal propagation through said fluid in the upstream and the downstream directions between said first and second transducers, comprising a first oscillator connected to energize said first transducer to transmit an ultrasonic continuously oscillatory signal of a first frequency, a second oscillator connected to energize said second transducer to transmit an ultrasonic continuously oscillatory signal of a second frequency, a first detector deriving from said first transducer, operating as a receiver, a first derived electrical signal, a parameter of which first derived signal is related to the time of signal propagation between the said transducers in one said direction, a second detector deriving from the said second transducer, operating as a receiver, a second derived electrical signal, a parameter of which is related to the time of signal propagation between the said transducers in the other direction, and signal phase-comparison means obtaining from said first and second derived electrical signals and from said two oscillatory signals of said first and second frequencies an output signal representative of the rate of flow of the said fluid relative to the said two transducers.

In order that the present invention may be readily carried into effect, one embodiment will now be described in detail, by way of example, with reference to the accompanying drawing which illustraters in schematic form an example of one arrangement of a flowmeter according to the invention.

In the drawing, two oscillators 1 and 2 are provided to generate output signals of different frequencies $f_1$ and $f_2$, respectively, which signals are applied to transducers 3 and 4 respectively. The transducers 3 and 4 are set in the walls of a tube 5, spaced at a distance $d$ apart, the path between the transducers 3 and 4 crossing the tube 5 at an angle $\alpha$ to the direction of flow in the tube 5, that is, the axial direction of the tube. The transducers 3 and 4 are thus also spaced apart in the direction of flow by the distance $d \cos \alpha$.

The two output signals from oscillators 1 and 2 can be expressed as:
$$E_1 = A \sin (\omega_1 t + \theta_1)$$
and
$$E_2 = B \sin (\omega_2 t + \theta_2)$$
where A and B are the respective signal amplitudes, $\omega_1 = 2\pi f_1$, $\omega_2 = 2\pi f_2$, $\theta_1$ and $\theta_2$ represent the respective signal phases at time $t=0$.

The signal applied to transducer 3 from oscillator 1 is propagated to transducer 4 as an ultrasonic signal and reaches transducer 4 after a time delay $t_d$, which depends on the velocity of propagation $c$ of sound in the fluid medium flowing in the tube 5 and the velocity $v$ of that fluid medium. Similarly, the signal from transducer 4 to transducer 3 experiences a time delay $t_u$, which is different from the time delay $t_d$.

The signals present at transducer 3 are therefore:
$$E_1 = A \sin (\omega_1 + \theta_1)$$
and
$$E_3 = C \sin [\omega_2(t+t_u) + \theta_2]$$
$$= C \sin (\omega_2 t + \theta_2 - \phi_u)$$
where
$$\phi_u = \omega_2 t_u$$

Likewise, the signals present at transducer 4 are:
$$E_2 = B \sin (\omega_2 t + \theta_2)$$
and
$$E_4 = D \sin [\omega_1(t-t_d) + \theta_1]$$
$$= D \sin (\omega_1 t + \theta_1 - \phi_d)$$
where
$$\phi_d = \omega_1 t_d$$

The signals $E_1$ and $E_3$ at transducer 3 are applied to a conventional mixer circuit 6 one output signal component of which is:
$$E_5 = Q \cos [(\omega_1 - \omega_2)t + (\theta_1 - \theta_2) + \phi_u]$$
$$= Q \cos (pt + \theta + \phi_u)$$
where
$$Q = AC, \; p = \omega_1 - \omega_2 \text{ and } \theta = \theta_1 - \theta_2$$

The signals $E_2$ and $E_4$ at transducer 4 are applied to a similar mixer circuit 7, one output signal component of which is:
$$E_6 = R \cos (pt + \theta - \phi_d)$$
where
$$R = BD, \; p = \omega_1 - \omega_2$$
and
$$\theta = \theta_1 - \theta_2$$

These output signal components are supplied from mixers 6 and 7 to a multiplier 8 to derive the product of $E_5$ and $E_6$, this product comprising a signal component:
$$E_7 = \tfrac{1}{2} QR \cos [2pt + 2\theta + (\phi_u - \phi_d)]$$

(The other component $\tfrac{1}{2}QR \; (\phi_u + \phi_d)$ is a D.C. component and is eliminated in the circuitry.)

The output signals $E_1$ and $E_2$ from oscillators 1 and 2 are also supplied to a mixer circuit 9, from which is derived an output signal component:

$$E_8 = S \cos(pt+\theta)$$

This output signal component $E_8$ is applied to a conventional frequency doubling circuit 10 to provide a signal:

$$E_9 = T \cos(2pt - 2\theta)$$

Finally, the two signals $E_7$ and $E_9$, which are both of angular frequency $2p$, are applied as input signals to a phase comparator 11 wherein the phase difference $$\Delta\phi = \phi_u - \phi_d$$

is detected. The output signal representative of the phase difference is fed to an indicator 12.

This phase difference $$\Delta\phi = \omega_2 t_u - \omega_1 t_d$$

Now, $$t_u = \frac{d}{c - v \cos \alpha}$$

and $$t_d = \frac{d}{c + v \cos \alpha}$$

Therefore, $$\Delta\phi = \frac{2\omega d \cos \alpha}{c^2 - v^2 \cos^2 \alpha}\left(1 + \frac{1}{2}p \frac{c}{v \cos \alpha}\right)$$

where $\omega = \frac{1}{2}(\omega_1 + \omega_2)$, i.e. the mean angular velocity.
Then $$\Delta\phi = \frac{2\omega d v \cos \alpha}{c^2}\left(1 + \frac{1}{2}\frac{p/\omega}{v \cos \alpha/c}\right)$$

when $v \ll c$.

For accurate flow indication, the expression $$\frac{1}{2}\frac{p/\omega}{v/c}$$

must be very much less than unity. For example, when water flow of 1.5 m./sec. is being measured, for which $c = 1500$ m./sec., for 1% accuracy, $p/\omega$ should not exceed $2 \times 10^{-5}$. However, if account is taken of this term in calibration, and if variations in $c$ amount to only 10% of its nominal value, then $p/\omega$ may be increased to $2 \times 10^{-4}$.

For example, if the measurement is being made at about 5 mc./s., the maximum allowable difference between the two oscillator frequencies is 1000 c./s. This necessitates a comparatively rigid control of the oscillators frequency difference, such as by use of crystal controlled oscillators or any other suitable means.

A considerable advantage of the above arrangement is that apart from the oscillators 1 and 2 the remaining electronic circuits all operate in the audio frequency range.

It will be seen that in the above considerations no account has been taken of the term $1/c^2$ which appears in the expression for $\Delta\phi$. Any corrections which must be made for variations in $c$ may be performed by means with which the present invention is not concerned.
where $\omega = \frac{1}{2}(\omega_1 + \omega_2)$, i.e. the mean angular velocity.

In the above arrangement, the transducers may be fitted into the opposite sides of tube 5 by any suitable method. However, the arrangements in accordance with the invention are not intended to be limited to use with tubes or pipes but may be applied to the measurement of the relative motion between any body and a fluid.

What I claim is:
1. An ultrasonic flowmeter for measuring the rate of fluid flow relatively to first and second transducers spaced apart up-stream and down-stream of said fluid flow and defining a transmission path for ultrasonic waves therebetween through said fluid, comprising a first oscillator connected to energize said first transducer as a transmitter, a second oscillator connected to energize said second transducer as a transmitter, a first mixer supplied with signals both from said first oscillator and from said first transducer operating as a receiver and supplying a signal to a first frequency multiplier, a second mixer supplied with signals both from said second oscillator and from said second transducer operating as a receiver and supplying a signal to said first frequency multiplier, a third mixer supplied with signals both from said first and said second oscillators and supplying a signal to a second frequency multiplier, a phase comparator connected to compare the output signals from said first and second frequency multipliers and indicating means responsive to the phase difference between the two said output signals.

2. An ultrasonic flowmeter for measuring the rate of fluid flow relatively to first and second transducers spaced apart up-stream and down-stream of said fluid flow and defining a transmission path for ultrasonic waves therebetween through said fluid, comprising a first oscillator connected to energize said first transducer as a transmitter, a second oscillator connected to energize said second transducer as a transmitter said first and second transducers each receiving ultrasonic oscillations transmitted through said fluid from the other transducer, first signal comparison means for comparing the oscillations of said first oscillator and the oscillations received by said first transducer, second signal comparison means for comparing the oscillations of said second oscillator and the oscillations received by said second transducer, third signal comparison means for comparing the oscillations of said first and second oscillators, means for deriving the product of output signals from said first and second signal comparison means, frequency multiplier means for multiplying the frequency of output signals from said third signal comparison means, fourth signal comparison means for comparing output signals from said product deriving means and said multiplier means and indicator means responsive to the output of said fourth signal comparison means.

3. An ultrasonic flowmeter for measuring the rate of fluid flow relative to first and second transducers spaced apart along the flow path of said fluid and defining a transmission path for ultrasonic waves therebetween through said fluid, both of said first and second transducers being simultaneously operative as transmitters and as receivers of said ultrasonic waves so as to provide simultaneous signal propagation through said fluid in the upstream and the downstream directions between said first and second transducers, comprising a first oscillator connected to energize said first transducer to transmit an ultrasonic continuously oscillatory signal of a first frequency, a second oscillator connected to energize said second transducer to transmit an ultrasonic continuously oscillatory signal of a second frequency, a first detector deriving from said first transducer, operating as a receiver, a first derived electrical signal, a parameter of which first derived signal is related to the time of signal propagation between the said transducers in one said direction, a second detector deriving from the said second transducer, operating as a receiver, a second derived electrical signal, a parameter of which is related to the time of signal propagation between the said transducers in the other direction, signal phase-comparison means obtaining from said first and second derived electrical signals and from said two oscillatory signals of said first and second frequencies an output signal representative of the rate of flow of the said fluid relative to the said two transducers, first, second and third mixers, a frequency doubler, a frequency multiplier, and a phase comparator having first and second inputs, the said two oscillatory electrical signals of said first and second frequencies being fed as input to the said first mixer, the output signal of the said first mixer being fed, by way of the said frequency doubler to the said first input of the said phase comparator, the oscillatory electrical signal of said first frequency being fed with the said second derivative signal to the said second mixer, the said oscillatory electrical signal of said second frequency being fed with the said first derivative signal to the said third mixer, the output signals of the said second and third mixers being fed to the said second input of the phase comparator by way of the said frequency multiplier providing a signal of the same frequency as that fed to the said first input of the said phase comparator.

References Cited in the file of this patent

UNITED STATES PATENTS

| | | |
|---|---|---|
| 2,621,243 | Sunstein | Dec. 9, 1952 |
| 2,746,291 | Swengel | May 22, 1956 |
| 2,912,856 | Kritz | Nov. 17, 1959 |
| 2,949,772 | Kritz | Aug. 23, 1960 |
| 2,991,650 | Katzenstein et al. | July 11, 1961 |

FOREIGN PATENTS

| | | |
|---|---|---|
| 776,526 | Great Britain | June 5, 1957 |